US008427687B2

(12) United States Patent
Toizumi et al.

(10) Patent No.: US 8,427,687 B2
(45) Date of Patent: Apr. 23, 2013

(54) PRINTING CONTROL SYSTEM DETERMINING FINAL PRINT CONDITION AS ENTERED FIRST PRINT CONDITION IF ENTERED FIRST PRINT IS A CHANGE INHIBITED PRINT CONDITION, AND IF NOT, AS USER SELECTED ONE OF ENTERED FIRST PRINT CONDITION OR STORED SECOND PRINT CONDITIONS HAVING A HIGHER RATIO OF REDUCTION IN USE OF PRINTING SHEETS THAN FIRST PRINTING CONDITION; AND PRINTING SYSTEM UTILIZING THE SAME

(75) Inventors: Tomoko Toizumi, Osaka (JP); Tsutomu Yoshimoto, Osaka (JP); Masanori Matsumoto, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 317 days.

(21) Appl. No.: 12/924,545

(22) Filed: Sep. 29, 2010

(65) Prior Publication Data

US 2011/0075216 A1 Mar. 31, 2011

(30) Foreign Application Priority Data

Sep. 29, 2009 (JP) ................................. 2009-225386

(51) Int. Cl.
 *G06F 3/12* (2006.01)
(52) U.S. Cl.
 USPC ........ 358/1.15; 358/1.12; 358/1.13; 358/1.18
(58) Field of Classification Search .................. 358/1.15, 358/1.12, 1.13, 1.18
 See application file for complete search history.

(56) References Cited

U.S. PATENT DOCUMENTS

| 7,916,332 | B2 * | 3/2011 | Kato ............................. 358/1.15 |
| 8,120,809 | B2 * | 2/2012 | Mori ............................. 358/1.18 |
| 2001/0043359 | A1 * | 11/2001 | Mori et al. .................... 358/1.15 |
| 2003/0007181 | A1 * | 1/2003 | Nishikawa et al. .......... 358/1.18 |
| 2008/0259389 | A1 | 10/2008 | Takahashi |

FOREIGN PATENT DOCUMENTS

| JP | 2001180085 A | 7/2001 |
| JP | 2002-052782 A | 2/2002 |
| JP | 2003-260857 | 9/2003 |
| JP | 2004-302653 A | 10/2004 |
| JP | 2008268603 A | 11/2008 |

OTHER PUBLICATIONS

Machine translation for JP 2003-260857.*

* cited by examiner

*Primary Examiner* — Qian Yang
(74) *Attorney, Agent, or Firm* — Edwards Wildman Palmer LLP; David G. Conlin; David A. Tucker

(57) ABSTRACT

A printing control system includes: operation means configured to enter a first printing condition including the number of page images to be printed on one side or both sides of one printing sheet; and control means. The control means determines whether or not the first printing condition corresponds to any one of plural change inhibited printing conditions preset and then sets the first printing condition as a final printing condition when the first printing condition is determined as corresponding to any one of the change inhibited printing conditions while causing the display means to display one or more second printing conditions each providing a higher ratio of reduction in the usage of printing sheets than the first printing condition when the first printing condition is determined as not corresponding to any one of the change inhibited printing conditions.

6 Claims, 11 Drawing Sheets

FIG.6

| NUMBER OF PAGE IMAGES (M) | SINGLE-SIDE 2-Up (2in1) NUMBER OF PRINTING SHEETS (N) | S.-SIDE 2-Up (2in1) RATIO (S) OF REDUCTION IN THE USAGE OF PRINTING SHEETS (S) | S.-SIDE 4-Up (4in1) NUMBER OF PRINTING SHEETS (N) | S.-SIDE 4-Up (4in1) RATIO (S) OF REDUCTION IN THE USAGE OF PRINTING SHEETS (S) | S.-SIDE 8-Up (8in1) NUMBER OF PRINTING SHEETS (N) | S.-SIDE 8-Up (8in1) RATIO (S) OF REDUCTION IN THE USAGE OF PRINTING SHEETS (S) | DOUBLE-SIDE 1-Up (1in1) NUMBER OF PRINTING SHEETS (N) | D.-SIDE 1-Up (1in1) RATIO (S) OF REDUCTION IN THE USAGE OF PRINTING SHEETS (S) | D.-SIDE 2-Up (2in1) NUMBER OF PRINTING SHEETS (N) | D.-SIDE 2-Up (2in1) RATIO (S) OF REDUCTION IN THE USAGE OF PRINTING SHEETS (S) | D.-SIDE 4-Up (4in1) NUMBER OF PRINTING SHEETS (N) | D.-SIDE 4-Up (4in1) RATIO (S) OF REDUCTION IN THE USAGE OF PRINTING SHEETS (S) | D.-SIDE 8-Up (8in1) NUMBER OF PRINTING SHEETS (N) | D.-SIDE 8-Up (8in1) RATIO (S) OF REDUCTION IN THE USAGE OF PRINTING SHEETS (S) |
|---|---|---|---|---|---|---|---|---|---|---|---|---|---|---|
| 1 | 1 | 0% | | 0% | | 0% | 1 | 0% | | 0% | | 0% | | 0% |
| 2 | 1 | 50% | 1 | 50% | 1 | 50% | 1 | 50% | 1 | 50% | 1 | 50% | 1 | 50% |
| 3 | 2 | 33% | 1 | 67% | 1 | 67% | 2 | 33% | 1 | 67% | 1 | 67% | 1 | 67% |
| 4 | 2 | 50% | 1 | 75% | 1 | 75% | 2 | 50% | 1 | 75% | 1 | 75% | 1 | 75% |
| 5 | 3 | 40% | 2 | 60% | 1 | 80% | 3 | 40% | 2 | 60% | 1 | 80% | 1 | 80% |
| 6 | 3 | 50% | 2 | 67% | 1 | 83% | 3 | 50% | 2 | 67% | 1 | 83% | 1 | 83% |
| 7 | 4 | 43% | 2 | 71% | 1 | 86% | 4 | 43% | 2 | 71% | 1 | 86% | 1 | 86% |
| 8 | 4 | 50% | 2 | 75% | 1 | 88% | 4 | 50% | 2 | 75% | 1 | 88% | 1 | 88% |
| 9 | 5 | 44% | 3 | 67% | 2 | 78% | 5 | 44% | 3 | 67% | 2 | 78% | 1 | 89% |
| 10 | 5 | 50% | 3 | 70% | 2 | 80% | 5 | 50% | 3 | 70% | 2 | 80% | 1 | 90% |
| 11 | 6 | 45% | 3 | 73% | 2 | 82% | 6 | 45% | 3 | 73% | 2 | 82% | 1 | 91% |
| 12 | 6 | 50% | 3 | 75% | 2 | 83% | 6 | 50% | 3 | 75% | 2 | 83% | 1 | 92% |
| 13 | 7 | 46% | 4 | 69% | 2 | 85% | 7 | 46% | 4 | 69% | 2 | 85% | 1 | 92% |
| 14 | 7 | 50% | 4 | 71% | 2 | 86% | 7 | 50% | 4 | 71% | 2 | 86% | 1 | 93% |
| 15 | 8 | 47% | 4 | 73% | 2 | 87% | 8 | 47% | 4 | 73% | 2 | 87% | 1 | 93% |
| 16 | 8 | 50% | 4 | 75% | 2 | 88% | 8 | 50% | 4 | 75% | 2 | 88% | 1 | 94% |
| 17 | 9 | 47% | 5 | 71% | 3 | 82% | 9 | 47% | 5 | 71% | 3 | 82% | 2 | 88% |
| 18 | 9 | 50% | 5 | 72% | 3 | 83% | 9 | 50% | 5 | 72% | 3 | 83% | 2 | 89% |
| 19 | 10 | 47% | 5 | 74% | 3 | 84% | 10 | 47% | 5 | 74% | 3 | 84% | 2 | 89% |
| 20 | 10 | 50% | 5 | 75% | 3 | 85% | 10 | 50% | 5 | 75% | 3 | 85% | 2 | 90% |
| 21 | 11 | 48% | 6 | 71% | 3 | 86% | 11 | 48% | 6 | 71% | 3 | 86% | 2 | 90% |
| 22 | 11 | 50% | 6 | 73% | 3 | 86% | 11 | 50% | 6 | 73% | 3 | 86% | 2 | 91% |
| 23 | 12 | 48% | 6 | 74% | 3 | 87% | 12 | 48% | 6 | 74% | 3 | 87% | 2 | 91% |
| 24 | 12 | 50% | 6 | 75% | 3 | 88% | 12 | 50% | 6 | 75% | 3 | 88% | 2 | 92% |
| 25 | 13 | 48% | 7 | 72% | 4 | 84% | 13 | 48% | 7 | 72% | 4 | 84% | 2 | 92% |
| 26 | 13 | 50% | 7 | 73% | 4 | 85% | 13 | 50% | 7 | 73% | 4 | 85% | 2 | 92% |
| 27 | 14 | 48% | 7 | 74% | 4 | 85% | 14 | 48% | 7 | 74% | 4 | 85% | 2 | 93% |
| 28 | 14 | 50% | 7 | 75% | 4 | 86% | 14 | 50% | 7 | 75% | 4 | 86% | 2 | 93% |
| 29 | 15 | 48% | 8 | 72% | 4 | 86% | 15 | 48% | 8 | 72% | 4 | 86% | 2 | 93% |
| 30 | 15 | 50% | 8 | 73% | 4 | 87% | 15 | 50% | 8 | 73% | 4 | 87% | 2 | 93% |
| 31 | 16 | 48% | 8 | 74% | 4 | 87% | 16 | 48% | 8 | 74% | 4 | 87% | 2 | 94% |
| 32 | 16 | 50% | 8 | 75% | 4 | 88% | 16 | 50% | 8 | 75% | 4 | 88% | 2 | 94% |

FIG.9

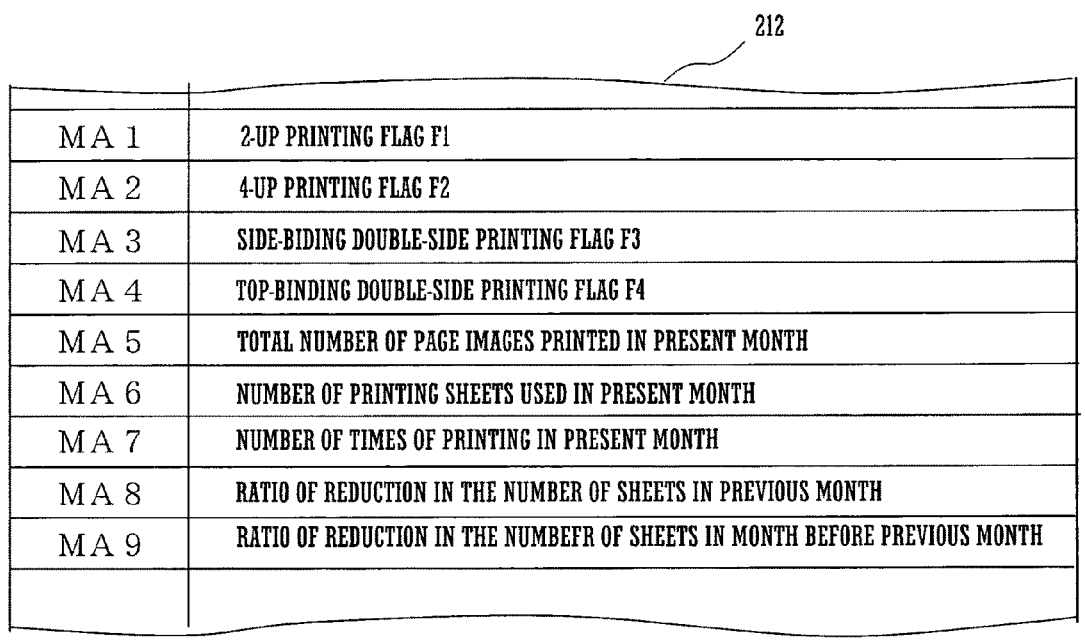

| MA1 | 2-UP PRINTING FLAG F1 |
| MA2 | 4-UP PRINTING FLAG F2 |
| MA3 | SIDE-BIDING DOUBLE-SIDE PRINTING FLAG F3 |
| MA4 | TOP-BINDING DOUBLE-SIDE PRINTING FLAG F4 |
| MA5 | TOTAL NUMBER OF PAGE IMAGES PRINTED IN PRESENT MONTH |
| MA6 | NUMBER OF PRINTING SHEETS USED IN PRESENT MONTH |
| MA7 | NUMBER OF TIMES OF PRINTING IN PRESENT MONTH |
| MA8 | RATIO OF REDUCTION IN THE NUMBER OF SHEETS IN PREVIOUS MONTH |
| MA9 | RATIO OF REDUCTION IN THE NUMBEFR OF SHEETS IN MONTH BEFORE PREVIOUS MONTH |

PRINTING CONTROL SYSTEM DETERMINING FINAL PRINT CONDITION AS ENTERED FIRST PRINT CONDITION IF ENTERED FIRST PRINT IS A CHANGE INHIBITED PRINT CONDITION, AND IF NOT, AS USER SELECTED ONE OF ENTERED FIRST PRINT CONDITION OR STORED SECOND PRINT CONDITIONS HAVING A HIGHER RATIO OF REDUCTION IN USE OF PRINTING SHEETS THAN FIRST PRINTING CONDITION; AND PRINTING SYSTEM UTILIZING THE SAME

CROSS REFERENCE

This Nonprovisional application claims priority under 35 U.S.C. §119(a) on Patent Application No. 2009-225386 filed in Japan on Sep. 29, 2009, the entire contents of which are hereby incorporated by reference.

BACKGROUND OF THE INVENTION

The present invention relates to a printing control system and a printing system which are capable of reducing the usage of printing sheets.

From the viewpoint of global environmental protection focused in recent years, the printing technology field is increasingly demanded to save resources including printing materials used by image forming apparatuses such as printing sheets and coloring materials. Among the functions of image forming apparatuses, there are functions of the type which can reduce the number of printing sheets to be used for printing, such as a double-side printing function for printing images on both sides of a printing sheet and an aggregate printing function for printing a plurality of images on one printing sheet by scaling the images down, thereby facilitating the resources saving.

For example, a print setting proposing system is disclosed which is configured to present a user interface (UI) which allows the user to select a desired print application from at least two print applications in response to a request for printing from the user, propose a printing condition suitable for the print application that has been selected by the user using the UI, prepare printing data attached with the printing condition in response to approval of the user to the proposal, and transfer the printing data thus prepared to a printer (see Japanese Patent Laid-Open Publication No. 2004-302653).

Also disclosed is a printing information processing device which is configured to perform comparison between the print saving capability obtained from print setting information contained in a printing job and the print saving capability of an economical print setting previously established according to the print application of the printing job, select the print setting having the higher print saving capability, and perform printing according to the print setting selected (see Japanese Patent Laid-Open Publication No. 2001-180085).

The conventional print setting proposing system, however, involves a problem that the user is imparted with a sensation of troublesomeness because presentation of the user interface and the proposal of a printing condition are made every time the user makes a request for printing.

Because the conventional printing information processing device presumes the application of a printing job based on template information, keywords and schedule information that are contained in printing data, even a printing job that should not be changed in final form, such as poster printing and tab sheet printing, might be performed by economical printing. If a printing job having a setting for poster printing or tab sheet printing is executed by the economical printing, the resulting printed matter cannot be of any use and hence is wasteful.

Accordingly, a feature of the present invention is to provide a printing control system and a printing system which are capable of preventing the resulting printed matter from becoming useless and wasteful and motivating the user to save the usage of printing sheets by making a proposal of printing sheet saving to the user only when the requested printing job is a printing job that will raise no problem even if the final form of the printed matter is changed.

SUMMARY OF THE INVENTION

A printing control system according to the present invention comprises:

operation means configured to enter a first printing condition including the number of page images to be printed on one side or both sides of one printing sheet;

display means;

control means configured to set a final printing condition based on the first printing condition entered by the operation means; and printing means configured to perform printing based on the final printing condition set by the control means, wherein:

the control means determines whether or not the first printing condition corresponds to any one of plural change inhibited printing conditions preset and then sets the first printing condition as the final printing condition when the first printing condition is determined as corresponding to any one of the change inhibited printing conditions while the control means causes the display means to display one or more second printing conditions each providing a higher ratio of reduction in the usage of printing sheets than that of the first printing condition when the first printing condition is determined as not corresponding to any one of the change inhibited printing conditions; and the operation means includes selection means configured to select the final printing condition from the first printing condition entered by the operation means and the one or more second printing conditions displayed by the display means.

If the first printing condition entered from the user corresponds to any one of the change inhibited printing conditions, the first printing condition is set directly as the final printing condition. If the first printing condition does not correspond to any one of the change inhibited printing conditions, the display means displays the printing conditions each providing a higher ratio of reduction in the usage of printing sheets than the first printing condition for the user to select one of them.

The printing control system may have an arrangement wherein:

the control means includes storage means having stored therein a table registered with plural sheet saving printing conditions each including the number of page images to be printed on one side or both sides of one printing sheet, the number of page images to be printed and the ratio of reduction in the usage of printing sheets determined from these numbers;

when the first printing condition is determined as not corresponding to any one of the change inhibited printing conditions, the control means extracts from the table stored in the storage means one or more sheet saving printing conditions each providing a higher ratio of reduction in the usage of printing sheets than the first printing condition and then causes the display means to display, as the one or more second printing conditions, one or more predetermined sheet saving printing conditions selected from the one or more sheet saving printing conditions thus extracted; and the operation means includes selection means configured to select the final printing condition from the one or more second printing conditions displayed by the display means.

If the first printing condition does not correspond to any one of the changed inhibited printing conditions, the control means extracts from the table one or more sheet saving printing conditions each providing a higher ratio of reduction in the usage of printing sheets than the first printing condition by referencing the table. Then, the control means selects one or more predetermined sheet saving printing conditions from the one or more sheet saving printing conditions thus extracted and then causes the display means to display the sheet saving printing conditions thus selected as the one or more second printing conditions for the user to select one of them.

The foregoing and other features and attendant advantages of the present invention will become more apparent from the reading of the following detailed description of the invention in conjunction with the accompanying drawings.

BRIEF DESCRIPTION OF THE DRAWINGS

FIG. 6 is a table registered with plural sheet saving printing conditions;

FIG. 9 is a memory map of a relevant portion of a storage section;

DETAILED DESCRIPTION OF THE INVENTION

Figure 1:
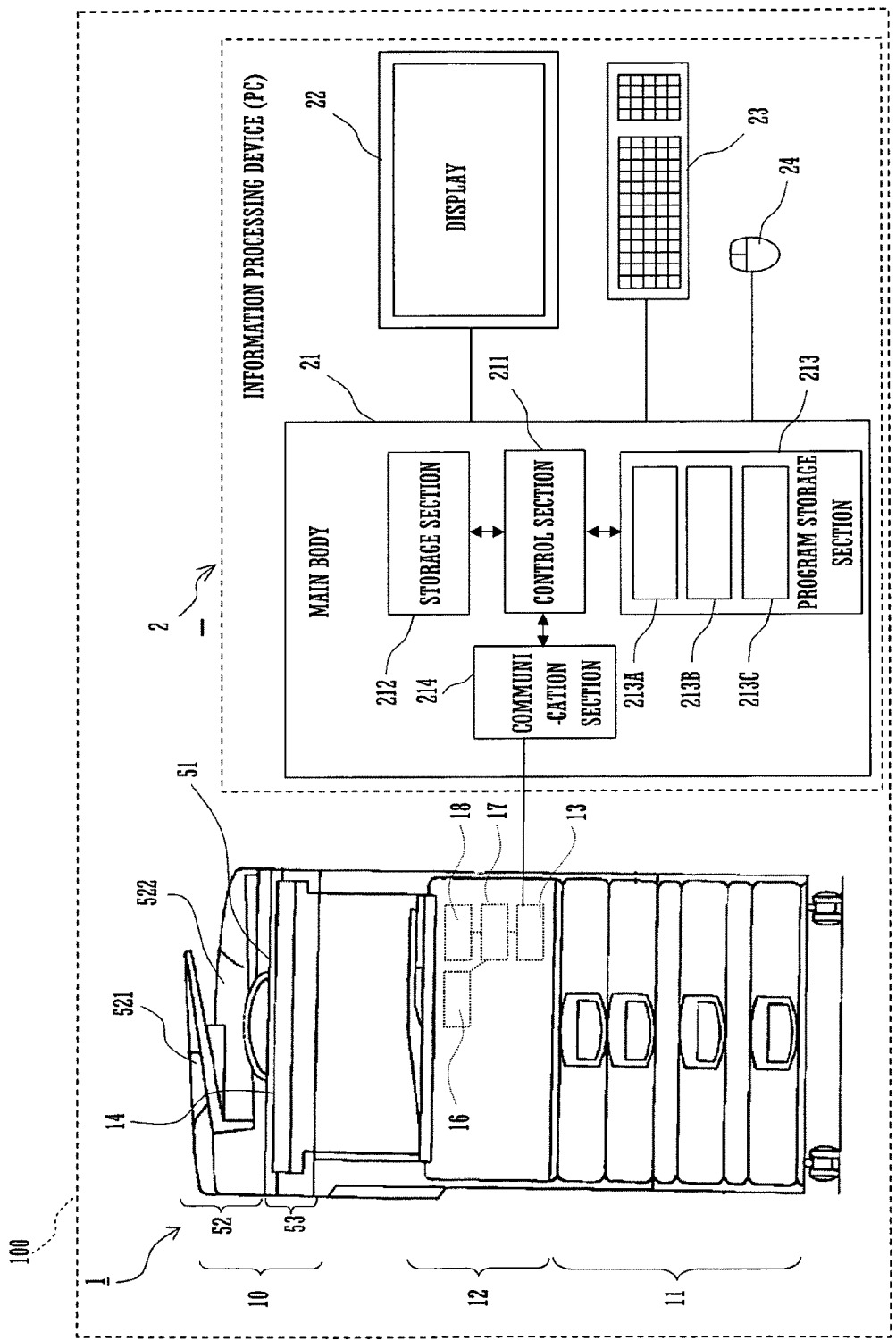
FIG. 1 is a block diagram illustrating a printing system to which a printing control system according to an embodiment of the present invention is applied.

Referring to FIG. 1, there is shown a printing system 100 according to an embodiment of the present invention which comprises a printer 1 and an information processing device 2 connected thereto.

The printer 1 includes an image reading section 10, a sheet feeding section 11, an image forming section 12, a communication section 13, an operating panel 14, a program storage section 16, a control section 17, and a storage section 18. For instance, the printer 1 is a multi-functional apparatus configured to perform electrophotographic printing and has the functions of a printer and a copier.

The image reading section 10 includes a document platen 51, an automatic document feeder (hereinafter will be referred to as "ADF") 52 disposed over the document platen 51, and a scanner unit 53 disposed below the document platen 51.

The image reading section 10 detects whether or not a document is placed on the document platen 51 by means of a non-illustrated sensor. The image reading section 10 generates image data by reading image information from the document fed onto or placed on the document platen 51 by means of the scanner unit 53 and then outputs the image data to the image forming section 12.

The ADF 25 serves also as a document cover and is mounted over the document platen 51 by means of a non-illustrated hinge to cover the document platen 51 openably. The ADF 52 detects whether or not a document is placed on a document tray 521 by means of a non-illustrated sensor. The ADF 52 feeds document sheets placed on the document tray 521 onto the document platen 51 one by one and delivers the document sheets from which the scanner unit 53 has read image information onto a document delivery tray 522.

An input mode in which a document is fed by the ADF 52 onto the document platen 51 for reading of image information from the document by the scanner unit 53 to input a page image, will hereinafter be referred to as "ADF mode". An input mode in which a document is placed on the document platen 51 for reading of image information from the document by the scanner unit 53 to input a page image, will hereinafter be referred to as "OC mode".

The sheet feeding section 11 includes a manual feed tray and plural sheet feed trays which can store therein copy paper sheets, such as A4 size sheets and A3 size sheets, and special-purpose sheets such as colored paper, cardboard and OHP film.

When the control section 17 detects that the operating panel 14 has received a copying start operation, the control section 17 causes the sheet feeding section 11 to feed a printing sheet to the image forming section 12 and then causes the image forming section 12 to carry out a printing process based on image data read from a document by the image reading section 10 to form an image on the printing sheet. When the image data transmitted from the information processing device 2 is received by the communication section 13 and then outputted to the image forming section 12, the printer 1 feeds a printing sheet from the sheet feeding section 11 to the image forming section 12 and then carries out a printing process by the image forming section 12 based on the image data transmitted from the information processing device 2 to form an image on the printing sheet.

The printer 1 can form images on different types of printing sheets including not only paper sheet but also a recording medium formed from a material other than paper such as OHP film. The type of printing process to be carried out by the printer 1 may be selected from a plurality of types irrespective of which type of printing, electrophotographic printing, ink jet printing or other type of printing.

The information processing device 2, which is a personal computer (PC) for example, includes a main body 21, a display 22 (which is equivalent to the informing means defined by the present invention), a keyboard 23, and a mouse 24. The main body 21 includes a control section 211, a storage section 212, a program storage section 213, and a communication section 214.

The control section 211 performs various controls including a control over operations of different sections of the main body 21, a display control over the display 22 connected to the main body 21, and an entry control associated with entry operations of the user on the keyboard 23 and the mouse 24. The keyboard 23 and the mouse 24 form the operation means defined by the present invention.

The program storage section 213 has installed therein an application program 213A for data preparation, a printer driver 213B for controlling the operation of the printer 1 during printing, and a printing control program 213C of the present invention, together with an operating system.

The control section 211 executes the programs stored in the program storage section 213. The control section 211 prepares image data including document data in accordance with entry operations performed by the user on the keyboard 23 and the mouse 24 during the execution of the application program 213A for data preparation stored in the program storage section 213. The control section 211 converts the image data thus prepared to display data and then displays the display data on the display 22 while storing it in the storage section 212.

The control section 211 prepares printing data from the image data stored in the storage section 212 in accordance with data on operations of the user on the keyboard 23 and the mouse 24 during the execution of the printer driver 213B stored in the program storage section 213. The printing data thus prepared is outputted to the printer 1 connected to the information processing device 2 from the communication section 214 either via a network or directly.

Figure 2:
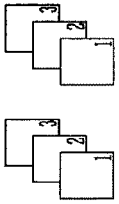
FIG. 2 is a view illustrating an exemplary printing window displayed by a printer driver.

When the user makes a request for printing by operating the keyboard 23 or the mouse 24 during the execution of the application program 213A, the control section 211 executes the printer driver 213B to cause the display 22 to open a printing window 31 illustrated as an example in FIG. 2.

As shown in FIG. 2, the printing window 31 is provided therein with a printer setting zone 311, a printing range zone 312, a "number of printed copies" zone 313, a scaling zone 314, and the like, together with a printing start button 315. The printing range zone 312 receives entry of specification of a printing range in the image data prepared by the application program. The "number of printed copies" zone 313 receives entry of a specified number of printed copies of image data in the printing range set by way of the printing range zone 312. The scaling zone 314 shows particulars of settings entered or calculation results with respect to the number of page images per sheet and the size of a printing sheet, which form a printing condition required to determine a scale factor for an image to be formed on a printing sheet. The printer setting zone 311 shows the name of printer 1 to be used for printing and receives entry of a change of the printer to be used for printing when a plurality of printers are present that can be handled by the information processing device 2. The printer setting zone 311 is provided with a property button 316 for checking and changing the printing condition to be used for printing. When the user operates the property button 316 by using the mouse 24, the display 22 opens a print settings window 32 shown as an example in FIG. 3.

Figure 3:
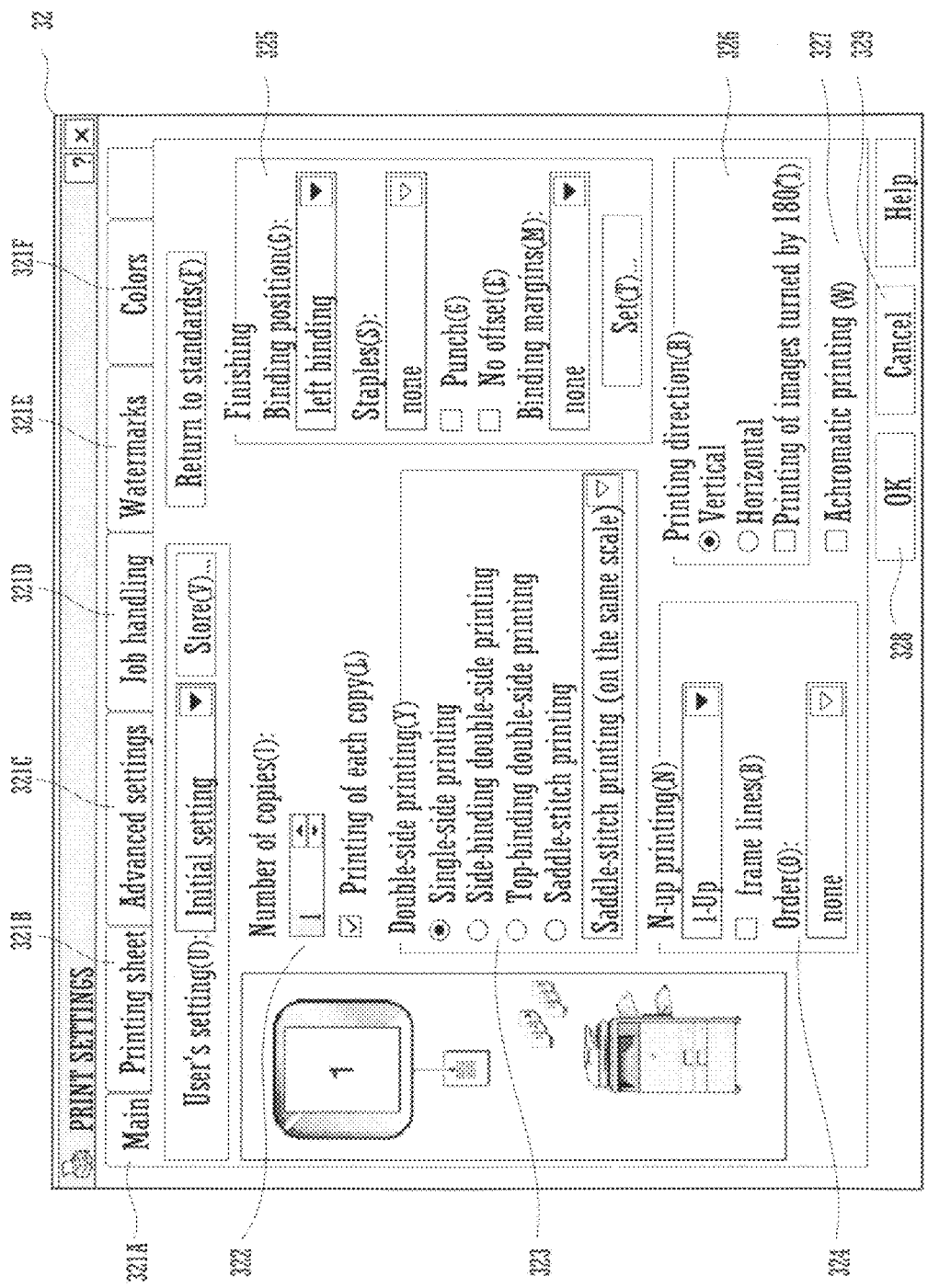
FIG. 3 is a view illustrating an exemplary print settings window displayed by the printer driver.

As shown in FIG. 3, the print settings window 32 is provided with a plurality of tabs 321A to 321G for displaying respective windows each providing information on use or nonuse of a respective one of available functions of the printer 1 and each capable of receiving entry of a change of printing condition for setting a condition for printing, post-processing or the like. For example, the main tab 321A provides a window having zones 322 to 327, each of which receives entry of a change of printing condition for a respective one of the functions including specification of the number of copies, double-side printing, aggregate printing, finishing, printing direction and monochromatic printing.

In the print settings window 32 there are provided an OK button 328 and a cancel button 329. The OK button 328 receives entry of a definitively changed printing condition. The cancel button 329 receives entry of cancellation of a changed printing condition. The OK button 328 and the cancel button 329 are setting completion buttons which are operated when confirmation of a printing condition and a change of printing condition have been completed.

Figure 4:
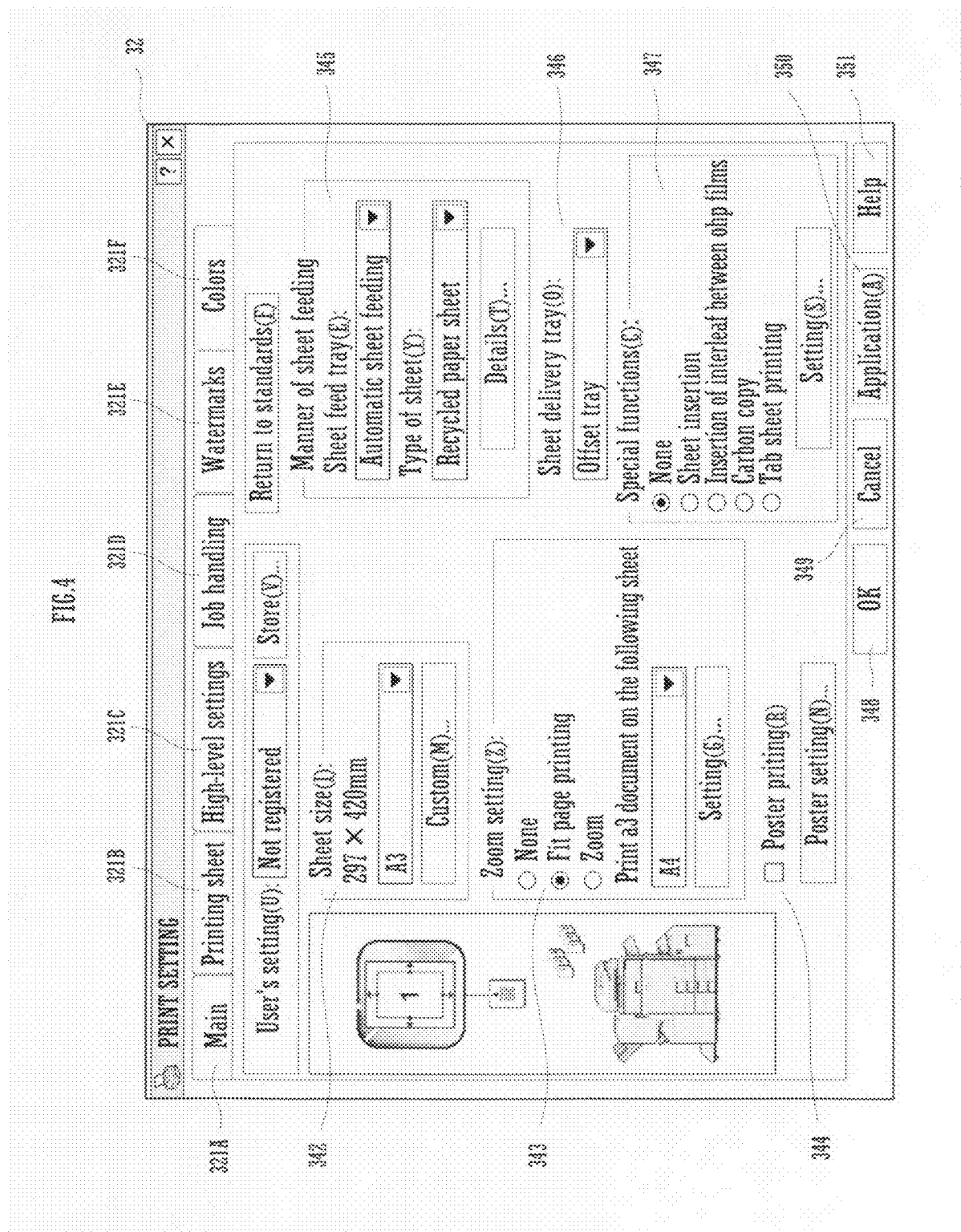
FIG. 4 is a view illustrating an exemplary printing paper window displayed by the printer driver.

As shown in FIG. 4, the printing paper tab 321B provides a window having zones 342 to 347, each of which receives entry of a change of printing condition for a respective one of functions related to sheet size, zoom setting, poster printing, manner of sheet feeding, sheet delivery tray, and special functions.

The window provided by the printing paper tab 321B is provided therein with an OK button 348, a cancel button 349, an application button 350, and a help button 351. The OK button 348 receives entry of a definitively changed printing condition. The cancel button 349 receives entry of cancellation of a changed printing condition. The application button 350 receives entry of an application of a changed printing condition. The help button 351 receives entry of questions about the plural tabs 321A to 321F, zones 342 to 347, manners of operations, and the like.

Figure 5:
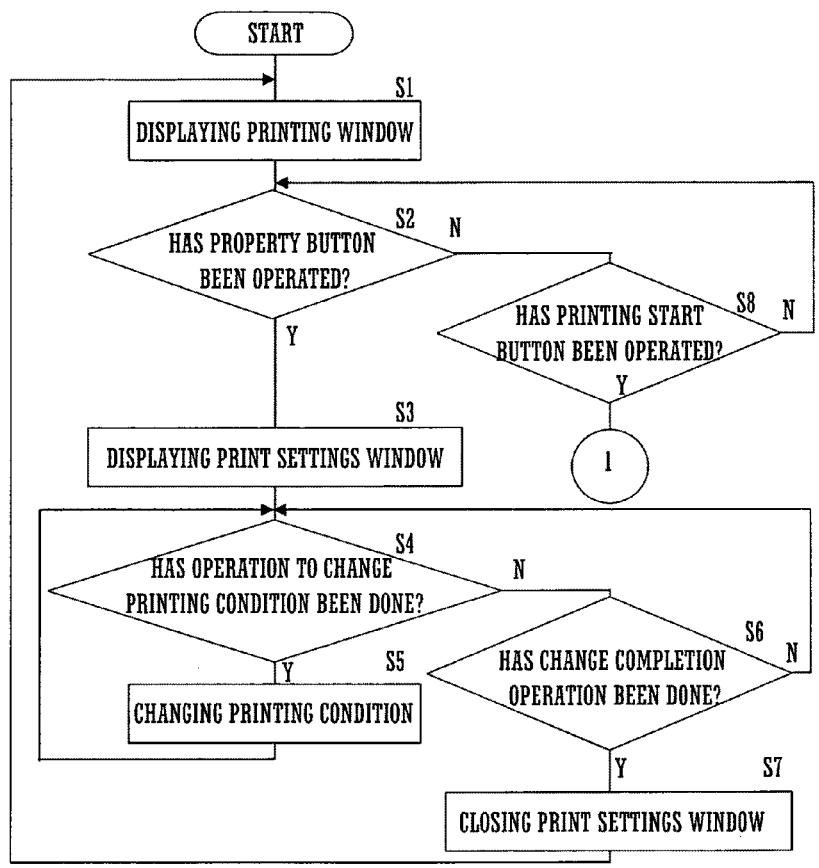
FIG. 5 is a flowchart of an exemplary process carried out by a control section driven by the printer driver.

As shown in FIG. 5, when the information processing device 2 receives a request for printing during the execution of the application program 213A, the control section 211 executes the printer driver 213B to display the printing window 31 shown in FIG. 2 at the frontmost position on the display 22 (step S1) and waits for the user to enter a printing condition and the like. When a request for confirmation of a printing condition for printing is made by the user operating the property button 316 in the printing window 31 (step S2), the control section 211 displays the print settings window 32 at the frontmost position on the display 22 (step S3) and waits for entry of a change of printing condition.

When the entry of a change of printing condition is made in the print settings window 32 (step S4), the control section 211 changes the printing condition for each function stored in the storage section 212 (step S5). When one of the setting completion buttons, i.e., the OK button 328 and the cancel button 329, in the print settings window 32, is operated (step S6), the print settings window 32 on the display 22 is closed and the process returns to step S1 (step S7). Thus, the printing widow 31 is again displayed at the frontmost position on the display 22. At that time, a printing condition is set which includes the number of page images to be printed per sheet and the total number of page images to be printed. At this stage, the printing condition entered by the user is fixed. The printing condition thus fixed is herein referred to as "first printing condition".

Upon detection of a user's operation on the printing start button 315 by using the mouse 24 to give an instruction to start printing (i.e., in response to an instruction to start printing) with the printing window 31 being displayed on the display 22, the control section 211 executes the printing control program 213C stored in the program storage section 213.

When the printing control program 213C is started up, the control section 211 checks the printing condition entered by the user (i.e., first printing condition) to determine whether or not a change from this printing condition to a sheet saving printing condition will result in a wasteful printed matter of no use. If it is determined that no problem will arise, the control section 211 selects one or more recommended printing conditions from one or more sheet saving printing conditions that can reduce the usage of printing sheets more than the first printing condition and displays the printing conditions thus selected on the display 22. The one or more recommended printing conditions are one or more second printing conditions. That printing condition which is selected by the user from the one or more second printing conditions displayed on the display 22 is set as a final printing condition.

The printing conditions which can reduce the usage of printing sheets (i.e., sheet saving printing conditions) more than the first printing condition include aggregate printing, double-side printing, and double-side aggregate printing.

The aggregate printing, which is also called M-up printing or Min1 printing, is a condition for collectively printing, on one side of a printing sheet, (M) number of images each corresponding to one page to be originally printed on one side of one printing sheet (hereinafter will be referred to as "page image"). For example, 2-up printing scales a page image down to 50% to print it on a printing sheet; 4-up printing scales a page image down to 25% to print it on a printing sheet; and 8-up printing scales a page image down to 12.5% to print it on a printing sheet.

The double-side printing is a condition for printing one page image on each of the both sides of a printing sheet without scaling it down.

The double-side aggregate printing is a condition for collectively printing (M) number of page images on each of the both sides of a printing sheet.

Some printing conditions used for printing, if changed to any one of the sheet saving printing conditions, will produce wasteful printed matters of no use and hence should not be changed in the final form of resulting printed matters (i.e., change inhibited printing conditions). Examples of such change inhibited printing conditions include the following conditions.

(1) Binding Margins

Binding margins is a setting for providing margins for stapling or punching plural printing sheets by moving a page image to the left, right or top of a printing sheet. This change inhibited printing condition is set by way of the zone 325 shown in FIG. 3.

(2) Customization of Sheet Size

Customization of sheet size is a setting for printing on a printing sheet having a size set as desired by the user. This change inhibited printing condition is set by operating a custom button 342A in the zone 342 shown in FIG. 4.

(3) Fit Page Printing

Fit page printing is a setting for printing a page image that is fitted to the size of a printing sheet stored in the sheet feeding section 11 by being scaled up or down. This change inhibited printing condition is set by way of the zone 343 shown in FIG. 4.

(4) Poster Printing

Poster printing is a setting for scaling up one page image and printing the page image thus scaled up on plural printing sheets dividedly. This change inhibited printing condition is set by way of the zone 344 shown in FIG. 4.

(5) Sheet Insertion

Sheet insertion is a setting for printing on a cover, back cover or specified page of a document by using a printing sheet that is different in type from those used for other pages. This change inhibited printing condition is set by placing colored paper or cardboard in a particular tray disposed in the sheet feeding section 11, specifying the type of the printing sheet placed in that tray by way of the zone 345 shown in FIG. 4 and then selecting the printing condition by way of the zone 347 shown in FIG. 4.

(6) Insertion of Interleaf Between OHP Films

This setting is used for printing on OHP films and prevents OHP films from adhering to each other by inserting a sheet between the OHP films. This change inhibited printing condition is set by way of the zone 347 shown in FIG. 4. In the printer 1, OHP films are previously accommodated in a particular sheet feed tray. The storage section 18 of the printer 1 and the storage section 212 of the information processing device 2 have stored therein information that OHP films are accommodated in the particular sheet feed tray (e.g., tray 1). When the "insertion of interleaf between OHP films" is set, the particular sheet feed tray accommodating OHP films therein and a particular sheet feed tray accommodating sheets for use as interleaves therein are selected before printing.

(7) Carbon Copy Printing

Carbon copy printing is a setting for printing the same page image on printing sheets of the same size accommodated in plural trays disposed in the sheet feeding section 11. This change inhibited printing condition is set by way of the zone 347 shown in FIG. 4.

(8) Tab Sheet Printing

Tab sheet printing is a setting for printing a character or letter on a tab of a tab sheet. This change inhibited printing condition is set by way of the zone 347 shown in FIG. 4. When the tab sheet printing is set, a particular sheet feed tray accommodating tab sheets therein is selected before printing.

With the change inhibited printing conditions (1) and (2), the printing position setting is changed from the initial printing condition setting. With the change inhibited printing conditions (3) and (4), the print size setting is changed from the initial printing condition setting. With the change inhibited printing conditions (5) to (8), the printing sheet setting is changed from the initial printing condition setting.

When in the initial setting status (i.e., when the initial printing condition setting is alive), the information processing device 2 is set to print an image on the whole of one side of an A4 size copy sheet at the same magnification. When the first printing condition entered by the user by way of the print settings window 32 is any one of the above-described change inhibited printing conditions (1) to (8), the information processing device 2 does not propose any one of the second printing conditions (i.e., recommended printing conditions). On the other hand, when the first printing condition is not any one of the above-described change inhibited printing conditions (1) to (8), the information processing device 2 extracts one or more sheet saving printing conditions which can reduce the usage of printing sheets as compared with the first printing condition entered by the user by referencing the storage section 212 to be described later and then proposes one or more second printing conditions (i.e., recommended printing conditions) selected from the sheet saving printing conditions thus extracted. Since the number of page images is fixed according to the first printing condition entered, the ratio of reduction in the usage of printing sheets can be calculated based on the number of page images. If there are sheet saving printing conditions that have higher sheet saving effects than the ratio of reduction in the usage of printing sheets thus calculated, printing conditions are selected from those sheet saving printing conditions by excluding certain conditions and proposed as the second printing conditions (i.e., recommended printing conditions). The information processing device 2 displays the second printing conditions thus proposed on the display 22.

FIG. 6 shows a table registered with plural sheet saving printing conditions each including the number of page images to be printed on one side or both sides of one printing sheet, the number of page images to be printed (i.e., the number of page images of a document) and the ratio of reduction in the usage of printing sheets determined from these numbers. In FIG. 6, "single-side 2-up", "single-side 4-up" and the like each represent the number of page images to be printed on one side or both sides of one printing sheet.

The ratio S of reduction in the usage of printing sheets indicates how much usage of printing sheets can be reduced by aggregate printing of page images under a sheet saving printing condition as compared with non-aggregate printing of the page images. The ratio S of reduction in the usage of printing sheets is represented by the following formula:

$$S(\%)=\{(M-N)/M\}\times100=(1-N/M)\times100$$

where M represents the number of page images and N represents the number of printing sheets used for printing.

For example, when 4-up printing (single-side) is selected for seven page images, the number of printing sheets used for printing is as small as two and, hence, five (=7−2) printing sheets can be reduced. Therefore, the ratio S of reduction in the usage of printing sheets is about 71% (=(1−2/7)×100).

In the information processing device 2, the storage section 212 has previously stored therein the table registered with plural sheet saving printing conditions as shown in FIG. 6. The information processing device 2 is configured such that the control section 211 references the table stored in the storage section 212 when necessary.

In the present embodiment, the control section 211 further has previously stored a threshold value of the ratio of reduction in the usage of printing sheets in the storage section 212. Such a threshold value is 50% for example. The control section 211 compares a ratio of reduction in the usage of printing sheets shown in FIG. 6 to the threshold value, selects those sheet saving printing conditions which provide ratios of reduction in the usage of printing sheet that are not less than the threshold value from the sheet saving printing conditions, and proposes the printing conditions thus selected as the second printing conditions (i.e., recommended printing conditions) to the user. It is possible to avoid proposing a specified one of the selected sheet saving printing conditions. For example, it is possible to avoid proposing 8-up printing which causes the character size to be reduced too much or to propose only the single-side aggregate printing. These settings can be previously made by the user.

In the example shown in FIG. 6, when the number of page images is one, any one of the sheet saving printing conditions cannot reduce the usage of printing sheets but merely reduces the size of a printed image and, hence, the ratio of reduction in the usage of printing sheets is 0% as can be seen from FIG. 6. In this case, any one of the second printing conditions (i.e., recommended printing conditions) is not proposed. When the number of page images is four, proposal is made so that the user can select any one of the second printing conditions (i.e., recommended conditions) consisting of 2-up printing (single-side), 4-up printing (single-side), double-side printing (1-up printing), and 2-up printing (double-side). In this case, the threshold value is 50% and specified sheet saving printing conditions are excluded.

The second printing conditions (i.e., recommended printing conditions) are proposed in such a manner that plural printing conditions are displayed for selection. It is desirable that the printing conditions be displayed together with the ratios of reduction in the usage of printing sheets obtained by the respective printing conditions for the user to select a printing condition having a higher sheet saving effect.

In determining whether or not proposed sheet saving printing is displayed, use may be made of reduction in the number of printed sheets. For example, when the threshold value of reduction in the number of printed sheets is set to two, determination is made as follows. In the cases where: the number of page images is one and the number of printing sheets to be used is one (i.e., the reduction in the number of printed sheets is zero); the number of page images is two and the number of printing sheets to be used is one (i.e., the reduction in the number of printed sheets is one); and the number of page images is three and the number of printing sheets to be used is two (i.e., the reduction in the number of printed sheets is one), printing is performed under the first printing condition entered by the user without displaying the proposed sheet saving printing. In other cases (where the reduction in the number of printed sheets is two or more), on the other hand, proposed second printing conditions (i.e., recommended printing conditions) are displayed for the user to select one of them and printing is performed under the second printing condition selected by the user.

The second printing conditions (i.e., recommended printing conditions) are proposed in such a manner that plural printing conditions are displayed for selection. It is desirable that the printing conditions be displayed together with the ratios of reduction in the usage of printing sheets obtained by the respective printing conditions for the user to select a printing condition having a higher sheet saving effect.

In selecting an appropriate one of the second printing conditions (i.e., recommended printing conditions), a non-illustrated setting window is opened and then a button associated with the appropriate printing condition is operated by means of the mouse.

Figure 7:
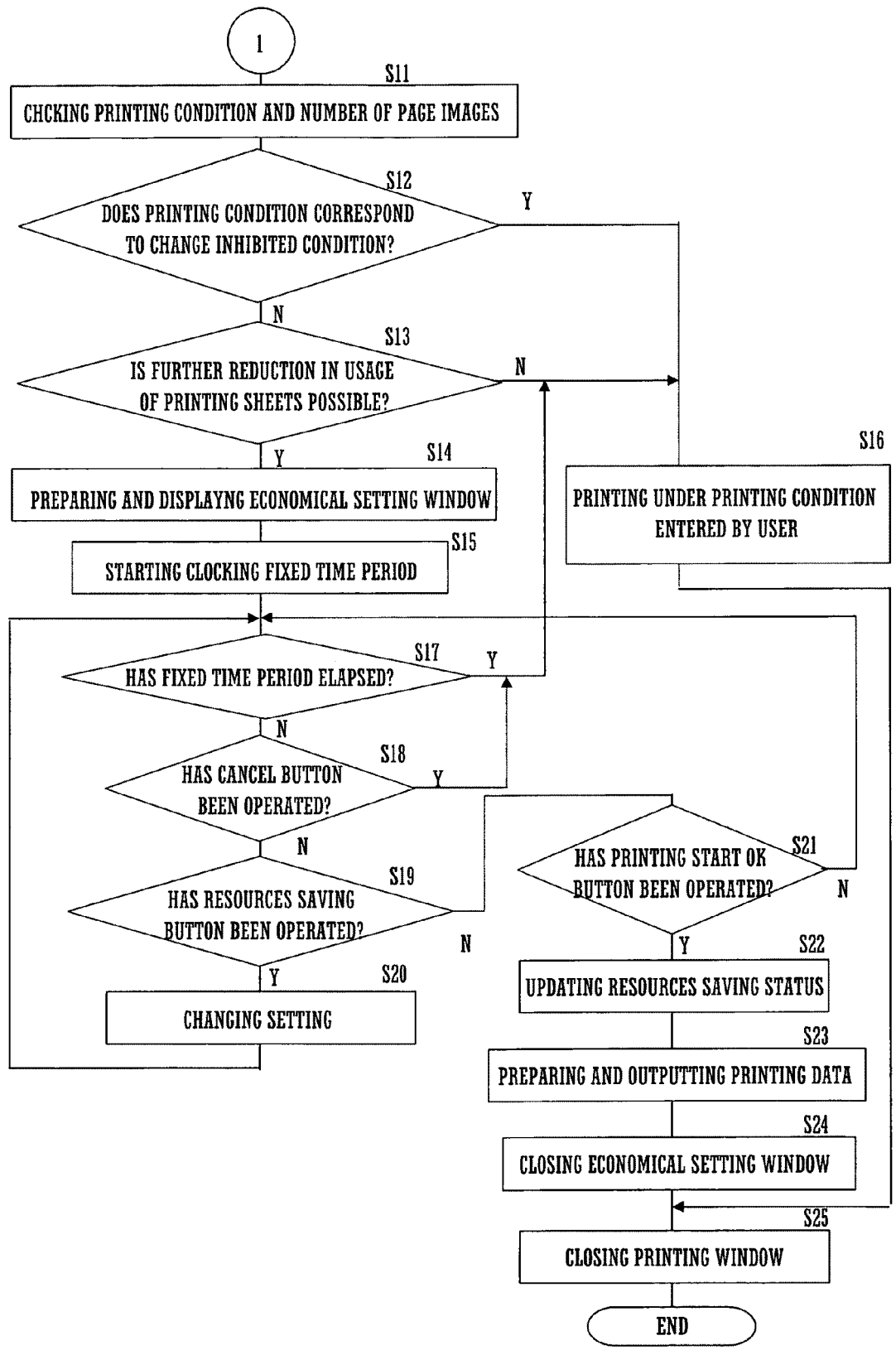
FIG. 7 is a flowchart of an exemplary process carried out by the control section according to a printing control program.

As shown in FIG. 5, the control section 211 starts carrying out the process illustrated in FIG. 7 when the printing control program 213C is started up in step S8. Initially, the control section 211 checks the first printing condition (including the number of page images to be printed on one side or both sides of a printing sheet) entered by the user, the total number of page images to be printed, and the like. The control section 211 also checks whether or not the first printing condition corresponds to any one of the change inhibited printing conditions (1) to (8) described above (step S12).

When the first printing condition is determined as not corresponding to any one of the change inhibited printing conditions (step S12), the control section 211 determines the sheet saving effects obtained as a result of change from the first printing condition to other printing conditions. Specifically, the control section 211 determines the ratios of reduction in the usage of printing sheets that are obtained when the first printing condition is changed to one or more sheet saving printing conditions that provide higher ratios of reduction in the usage of printing sheets than the first printing condition (step S13). In this step, the control section 211 references the table to be described later.

When one or more sheet saving printing conditions providing higher ratios of reduction in the usage of printing sheets are present, the one or more sheet saving printing conditions are used as one or more second printing conditions (i.e., recommended printing conditions). At that time, it is possible to select only those sheet saving printing conditions which provide higher ratios of reduction in the usage of printing sheets than the preset threshold value, as well as to exclude specified printing conditions. An economical setting window 33 (see FIG. 8) is prepared for displaying the one or more second printing conditions (i.e., recommended printing conditions) thus selected and is displayed at the frontmost position on the display 22 (step S14). The control section 211 displays one or more second printing conditions (i.e., recommended printing conditions) in the economical setting window 33. At the same time, the control section 211 starts clocking a predetermined fixed time period (for example 20 seconds) (step S15).

The control section 211 has stored in the storage section 212 information (on the resources saving status) including the total number of printed page images in the present month and the number of printing sheets used in the present month. When the first printing condition entered by the user is determined as corresponding to any one of the change inhibited printing conditions in step S12, the control section 211 does not update the aforementioned resources saving status. Likewise, when the first printing condition is determined as a print setting for feeding a special-purpose sheet from a particular sheet feed tray in step S12, the control section 211 does not update the aforementioned resources saving status. The control section 211 does not update the resources saving status when performing printing under any one of the change inhibited printing conditions because uniform management which includes aggregate calculation of all the results obtained from a printing is disadvantageous to users who frequently perform printing under any one of the change inhibited printing conditions and hence cannot be said as a fair management of the ratios of reduction in the usage of printing sheets.

Figure 8:
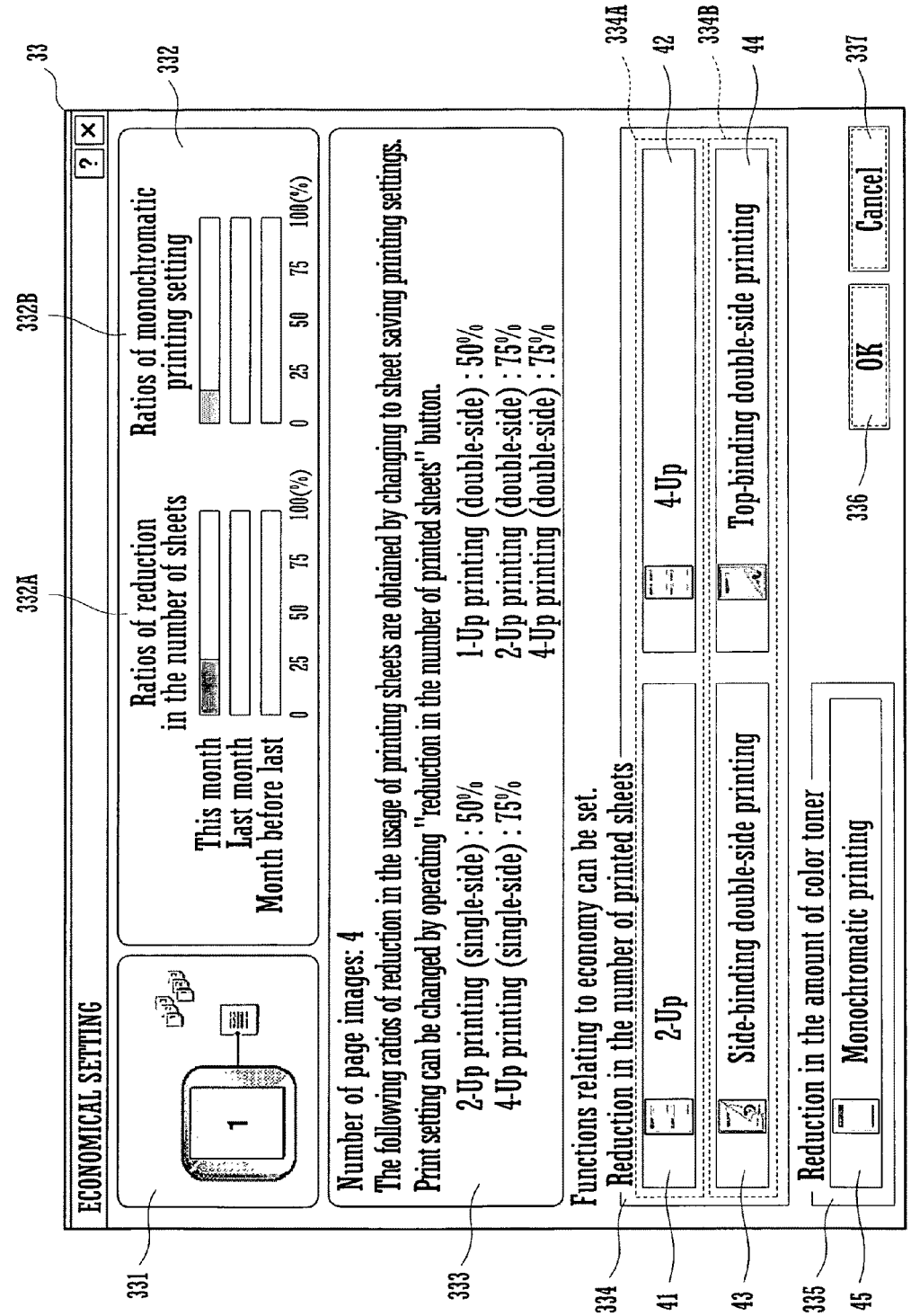
FIG. 8 is a view illustrating an exemplary display of a function setting status of an economical setting window displayed by the printing control program.

When the first printing condition corresponds to any one of the change inhibited printing conditions, the control section 211 does not prepare the economical setting window 33 as shown in FIG. 8 and determines the first printing condition as a final printing condition. Thereafter, the control section 211 converts the page image data stored in the storage section 212 to printing data so as to enable the printer 1 to perform printing under the final printing condition and then outputs the printing data to the printer 1 (step S16). For example, in the case where the user sets the "insertion of interleaf between OHP films", the control section 211 converts the page image data stored in the storage section 212 to printing data so that a page image is printed on one side of an OHP film without aggregate printing while an interleaf is inserted between OHP films and then outputs the printing data to the printer 1.

Thereafter, the control section 211 closes the printing window 31 (step S25) to terminate the process. When the printing data is received from the information processing device 2, the printer 1 performs printing on a printing sheet.

As shown in FIG. 8, the economical setting window 33 has a printed state display zone 331, a resources saving status display zone 332, a "ratios of reduction in the usage of printing sheets" display zone 333, a "reduction in the number of printed sheets" zone 334, a "reduction in the amount of color toner" zone 335, a printing start OK button 336, and a cancel button (printing condition unchanging button) 337.

The printed state display zone 331 graphically illustrates a printed state that will result when printing is performed under the first printing condition entered by the user which corresponds to one of those functions that can be performed by the printer 1 and can contribute to the resources saving.

The "ratios of reduction in the usage of printing sheets" display zone 333 displays second printing conditions (i.e., recommended printing conditions) together with the ratios of reduction in the usage of printing sheets obtained by the respective second printing conditions when the first printing condition entered by the user is changed to the second printing conditions. The "ratios of reduction in the usage of printing sheets" display zone 333 also displays information for urging the user to select any one of the second printing conditions (i.e., recommended printing conditions).

The "reduction in the number of printed sheets" zone 334 is a zone for setting conditions related to functions that can contribute to the resources saving by reducing the number of printing sheets to be used for printing based on the second printing conditions displayed in the "ratios of reduction in the usage of printing sheets" display zone 333. The "reduction in the number of printed sheets" zone 334 includes an aggregate printing condition setting zone 334A and a double-side printing condition setting zone 334B. The conditions set by way of these zones are each a final printing condition.

The aggregate printing condition setting zone 334A receives entry of a setting related to the aggregate printing function for printing plural page images on one side of a printing sheet by scaling the page images down. The aggregate printing condition setting zone 334A displays page images obtained by means of 2-Up button 41 and 4-Up button 42 for example.

The double-side printing condition setting zone 334B receives entry of a setting related to the double-side printing function for printing different page images on both sides of an unused printing sheet and displays page images obtained by means of a side-binding double-side printing button 43 and a top-binding double-side printing button 44 for example.

The "reduction in the amount of color toner" zone 335 receives entry of a setting related to a function that can contribute to the resources saving by reducing the amount of a coloring material, such as toner or ink, to be used in a printing process carried out by the printer 1 and displays a page image obtained by means of a monochromatic printing button 45. The monochromatic printing function is the function of reducing the amount of color toner or color ink to be used by converting color page image data to monochromatic printing data to be printed as a monochromatic page image. The 2-Up button 41, 4-Up button 42, side-binding double-side printing button 43, top-binding double-side printing button 44 and monochromatic printing button 45 in the economical setting window 33 are resources saving buttons which allow selection from the functions that can contribute to the resources saving.

When selecting the double-side aggregate printing, the user operates two buttons, i.e., 2-up button 41 or 4-up button 42 and side-binding double-side printing button 43 or top-binding double-side printing button 44.

The printing start OK button 336 is operated when the user gives a definitive instruction to start printing by the printer 1. In response to the operation on the printing start OK button 336, page image data is converted to printing data by a changed function setting and is outputted to the printer 1.

The cancel button 337 is operated to give an instruction to print under the first printing condition as entered by the user without changing the printing condition to any one of the second printing conditions. In response to the operation on the cancel button 337, the control section 211 converts page image data to printing data according to the first printing condition and outputs the printing data to the printer 1. As will be described later, the control section 211 closes the economical setting window 33 after lapse of the fixed time period to perform a control for causing printing to be performed under the first printing condition entered by the user. For this reason, it is possible to eliminate the cancel button 337.

The resources saving status display zone 332 displays the status of resources saving in printing processes having been performed by the printer 1. The resources saving status display zone 332 includes a "ratios of reduction in the number of sheets" display zone 332A and a "ratios of monochromatic printing setting" display zone 332B.

The "ratios of reduction in the number of sheets" display zone 332A shows statuses related to reduction in the number of printing sheets at intervals of a fixed time period, for example, the ratios of reduction in the number of sheets obtained during three months on a monthly basis. The ratio of reduction in the number of sheets is the ratio of reduction in the number of printing sheets made during the fixed time period which is obtained by subtracting the quotient obtained by dividing the number of printing sheets used for printing by the number of page images from 1 and expressing the resulting value as a percentage.

The "ratios of monochromatic printing setting" display zone 332B shows statuses related to reduction in the amount of coloring material used, for example, the ratios of monochromatic printing setting established during three months on a monthly basis. The ratio of monochromatic printing setting is the ratio of monochromatic printing processes performed to all the printing processes which the information processing device 2 has instructed the printer 1 to carry out.

Since the monochromatic printing departs from the concept of the present invention, description thereof will be omitted.

As shown in FIG. 7, the control section 211 checks whether or not the fixed time period has elapsed from the start of clocking the fixed time period in step S14 and checks whether or not an operation on button has been made (i.e., whether or not entry has been made of an instruction to permit printing or cancel printing under any one of the second printing condition) (steps S17 to S21). In response to receipt of the instruction entered by the operation on the cancel button 337 within the fixed time period to cancel printing under any one of the second printing conditions (step S18), the control section 211 causes the printer 1 to perform printing under the first printing condition without updating the resources saving status stored in the storage section 212 (step S16 which is equivalent to a second printing step).

When any one of the resources saving buttons 41 to 44 in the economical setting window 33 is operated within the fixed time period (step S19), the control section 211 changes the printing condition so as to use the function corresponding to the button operated (step S20).

In response to receipt of an instruction entered by operation on the printing start OK button 336 in the economical setting window 33 to permit printing under a recommended printing condition (step S21), the control section 211 updates the resources saving status stored in the storage section 212 (step S22 which is equivalent to an aggregate calculation step), converts page image data stored in the storage section 212 to printing data and then outputs the printing data to the printer (step S23). Thereafter, the control section 211 closes the economical setting window 33 and the printing window 31 (steps S24 and S25) to terminate the process.

If it is determined that the fixed time period has elapsed before any one of the buttons in the economical setting window 33 is operated (step S17), the control section 211 causes the printer 1 to perform printing under the first printing condition entered by the user without updating the resources saving status stored in the storage section 212 and without changing the print setting (step S16).

The control section 211 references the contents stored in the storage section 212 in preparing printing data in step S23.

As shown in FIG. 9, the storage section 212 has memory areas MA1 to MA4 which are assigned flags F1 to F4, respectively. The flag F1 indicates the status of the 2-up printing function being selected or not. The flag F2 indicates the status of the 4-up printing function being selected or not. The flag F3 indicates the status of the side-binding double-side printing function being selected or not. The flag F4 indicates the status of the top-binding double-side printing function being selected or not.

Though not shown in FIG. 9, the control section 211 performs management of data stored in the memory areas MA1 to MA9 of the storage section 212 on a user-by-user basis. When shared by plural users, the information processing device 2 is configured to be used by a user selected on a start screen. The control section 211 performs management of the ratios of reduction in the number of sheets and other information on a user-by-user basis in response to selection on the start screen. Alternatively, it is possible to perform management of identifications of individual users by allowing a user making request for printing to enter his or her user ID at the time of printing condition setting.

The control section 211 sets or resets the flags F1 to F4 according to the settings that have been established by way of the zones 323 and 324 at the time of operation on the OK button 328 in the print settings window 32 in step S6. For example, when the user operates the OK button 328 in step S6 after having selected the 2-up printing function by way of the zone 324 in step S4, the control section 211 sets the flag F1 of the memory area MA1.

When any one of the resources saving buttons 41 to 44 in the economical setting window 33 is operated in step S19, the control section 211 sets the associated one of the flags F1 to F4. For example, when the user operates the 2-up printing button in step S19, the control section 211 sets the flag F1 of the memory area MA1.

The memory areas MA5 to MA9 of the storage section 212 store therein the total number of page images printed in the present month (i.e., information on the number of page images printed in the present month), the number of printing sheets used for printing in the present month (i.e., information on the number of printing sheets printed in the present month), the total number of times of printing in the present month, the ratio of reduction in the number of sheets in the previous month, and the ratio of reduction in the number of sheets in the month before the previous month, respectively.

When the first printing condition entered by the user is determined as not corresponding to any one of the change inhibited printing conditions, the control section 211 updates the data in the memory areas MA5 and MA6 in step S22. At that time, the control section 211 adds the number of page images to be printed this time to the total number of page images printed in the present month which is stored in the memory area MA5 while adding the number of printing sheets to be used for printing to the number of printing sheets used for printing in the present month which is stored in the memory area MA6, thus performing aggregate calculation of data obtained during one month (i.e., during the fixed time period). Therefore, printing under any one of the second printing conditions results in a suppressed increase in the number of printing sheets used for printing (i.e., the number of printing sheets used for printing in the present month) and in a rise in the ratio of reduction in the number of sheets used by the user who has done printing.

On the other hand, when the first printing condition entered by the user is determined as corresponding to any one of the change inhibited printing conditions and printing is performed under the first printing condition (i.e., special printing is performed), the aggregate calculation does not reflect this printing and, hence, the ratio of reduction in the number of sheets does not vary.

The control section 211 updates the data stored in the memory areas MA5 to MA9 on the first day of each month by referencing information stored in a date storage area provided in the storage section 212.

In step S23, the control section 211 adds the number of page images to be printed this time to the total number of page images printed in the present month which is stored in the memory area MA5 while adding the number of printing sheets to be used for printing to the number of printing sheets used in the present month which is stored in the memory area MA6. The control section 211 updates the data stored in the memory areas MA5 to MA9 on the first day of each month by referencing information stored in the date storage area provided in the storage section 212.

In step 13, the control section 211 calculates the ratio of reduction in the number of sheets used in the present month based on the data stored in the memory areas MA6 and MA7 and displays the ratio thus calculated in the "ratios of reduction in the number of sheets" zone 332A.

In preparing the printing data in step S23, the control section 211 references the statuses of the flags F1 to F4 of the memory areas MA1 to MA4. In the case where the flag F1 is set, the control section 211 prepares printing data for printing two page images on one side of a printing sheet. In the case where the flag F2 is set, the control section 211 prepares printing data for printing four page images on one side of a printing sheet.

In the case where the flag F3 is set, the control section 211 prepares printing data for printing each page image in a state of being offset to the right for example. In the case where the flag F4 is set, the control section 211 prepares printing data for printing each page image in a state of being offset to the bottom for example.

In the case where the flag F1 or F2 and the flag F3 or F4 are set, the control section 211 prepares printing data for printing two or four page images on each of the both sides of a printing sheet.

In the case where the flag F3 or F4 is set, the control section 211 outputs the printing data together with a command to perform double-side printing to the printer 1.

Description will be made of a copying process carried out by the printer 1 alone.

Like the information processing device 2, the printer 1 has a program previously stored in the program storage section 16 for proposing the second printing conditions (i.e., recommended printing conditions) instead of the first printing condition even in performing copying by the printer 1 alone when any one of the change inhibited printing conditions is not set. The control section 17 is configured to read and execute the program.

Figure 10:
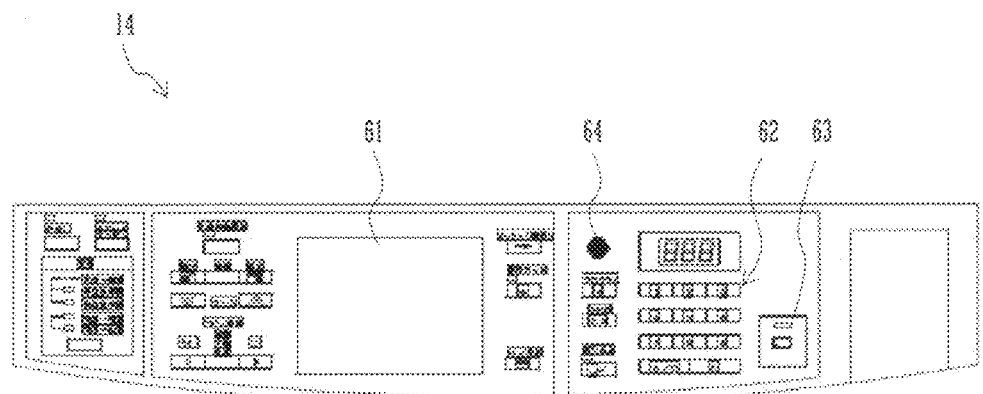
FIG. 10 is an overview of an operating panel.

As shown in FIG. 10, the printer 1 includes the operating panel 14 disposed on an upper surface on the front side of the image reading section 10. The operating panel 14 serves as an operating section and a display section both. The operating panel 14 has various operating portions and display portions including a touch panel 61, a ten-key pad 62, a start key 63 and a cancel button 64. By operating the operating panel 14, the user can set the number of copies (prints) and the type of printing sheets to be used, enter (set) a printing condition and establish a post-processing setting and like settings.

The change inhibited printing conditions each of which inhibits any change in the final form of a printed matter because a change from any one of the change inhibited printing condition to a sheet saving printing condition will result in a wasteful printed matter of no use when the printer 1 is solely used to perform copying, include for example the following conditions.

(A) Scaling Factor Setting

Scaling factor setting is a setting for printing with a scaling factor desired by the user by selecting any one of plural-level fixed scaling factors by using a scale-up key or a scale-down key or setting a desired scaling factor by using a zoom key.

(B) X/Y Independent Scaling

X/Y independent scaling is a setting for printing a document with its vertical and horizontal axes scaled independently.

(C) Specification of Document Size

Specification of document size is a setting for printing a document by specifying the size of the document manually when the document is not of any standard size or the size of the document is not correctly detected.

(D) Interleaf Setting

Interleaf setting is a setting for printing with another sheet inserted as an interleaf at a specified page.

(E) Tab Copying

Tab copying is a setting for performing copying on a tab portion of a tab sheet set. When the tab copying is set, a particular sheet feed tray accommodating tab sheets therein is selected before printing.

(F) Photo Repeat Copying

Photo repeat copying is a setting for printing plural copies of one document of a photo size on one printing sheet. Repeat copying is the function of repeatedly copying the image of a document.

(G) Scaling Up and Sequential Copying

Scaling up and sequential copying is a setting for copying a scaled-up image on plural printing sheets dividedly.

(H) A3 Wide Copying

A3 wide copying is a setting for printing the entire area of an A3 size document on an A3 wide printing sheet which is slightly larger than an A3 size printing sheet with the same scaling factor so as not to miss the periphery of the document. When the A3 wide copying is set, a particular sheet feed tray accommodating A3 wide printing sheets therein is selected before printing.

With the change inhibited printing conditions (A), (B), (C), (G) and (H), the print size setting is changed. With the change inhibited printing conditions (D) and (E), the printing sheet setting is changed. With the change inhibited condition (F), the repeat coping is selected.

According to the present invention, when any one of the above-described printing conditions (A) to (H) is set at the time of the start of printing, the second printing conditions (i.e., recommended printing conditions) for reduction in the usage of printing sheets are not proposed. On the other hand, when any one of the above-described printing conditions (A) to (H) is not set, proposal is made of the second printing conditions (i.e., recommended printing conditions) which can reduce the usage of printing sheets as compared with the first printing condition entered by the user. Specifically, the sheet saving effect obtained as a result of change from the first printing condition to a printing condition that can reduce the usage of printing sheets, such as aggregate printing, is determined. If the sheet saving effect is determined as being higher than that of the first printing condition, the printing condition having a higher sheet saving effect is displayed as a second printing condition (i.e., recommended printing condition) on the operating panel 14. In this case, it is possible to preset a threshold value of the rate of reduction in the usage of printing sheets and display on the operating panel 14 only those printing conditions which provide higher ratios of reduction in the usage of printing sheets than the threshold value as the second printing conditions (i.e., recommended printing conditions).

The printer 1 has the storage section 18 having stored therein a table as shown in FIG. 6 and the control section 18 configured to reference the table when necessary. In the printer 1, the control section 17 may be configured to calculate the ratio of reduction in the usage of printing sheets based on information including the number of page images and the number of printing sheets to be used for printing.

Figure 11:
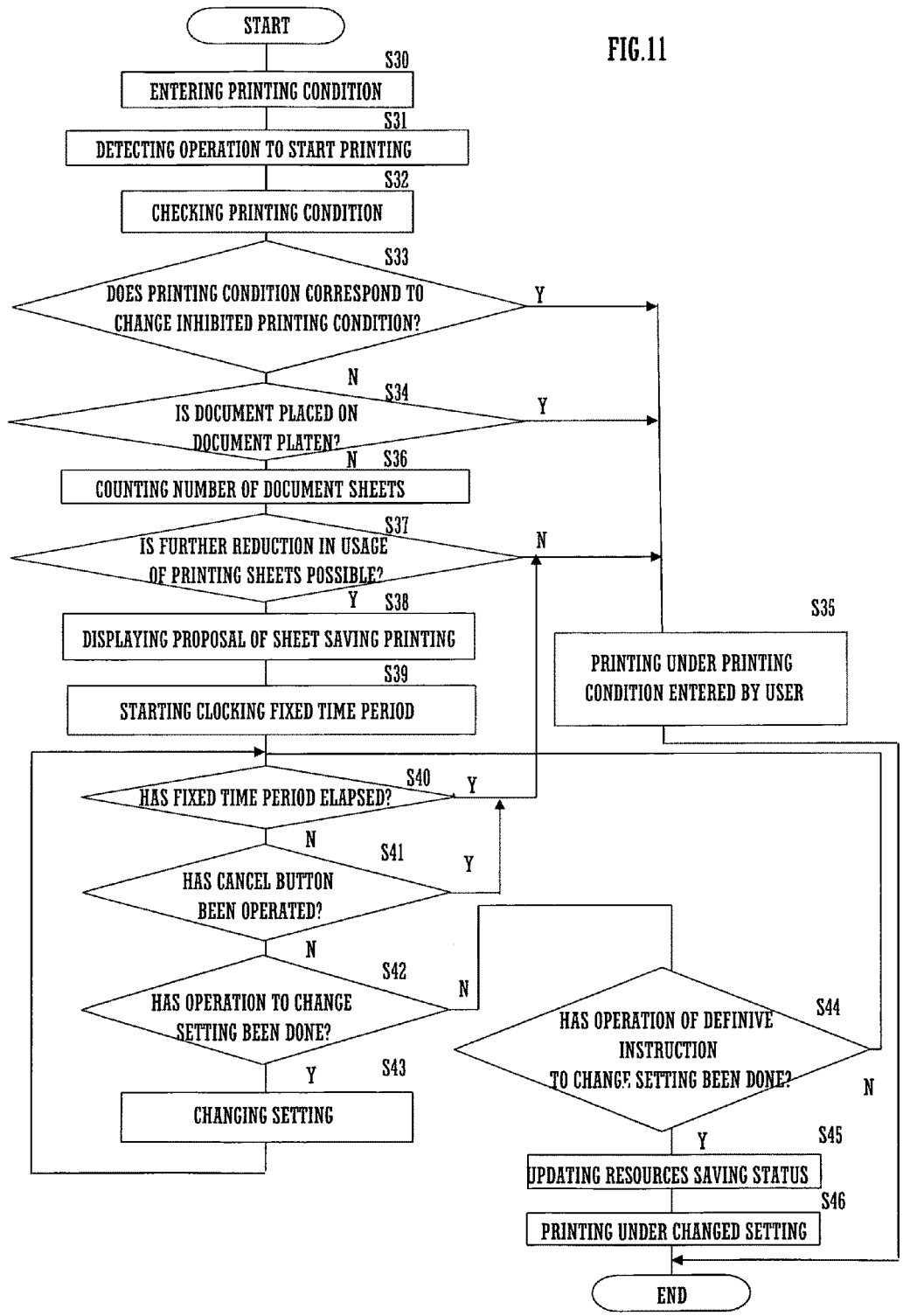
FIG. 11 is a flowchart of an exemplary process carried out by a printer.

FIG. 11 is a flowchart illustrating a copying process carried out by the printer.

When the control section 17 receives entry of a printing condition from the user at the operating panel 14 (step S30) and detects an operation of instruction to start printing (step S31), the control section 17 checks the printing condition set by the user (step S32).

If the printing condition is determined as corresponding to any one of the change inhibited printing conditions (step S33), the control section 17 causes the following process to be performed. That is, the page image of a document placed on the document platen 51 is read by the scanner unit 53 without proposal of the second printing conditions (i.e., recommended printing conditions) and without update of the resources saving status stored in the storage section 18. Thereafter, printing is performed under the first printing condition entered by the user (step S35). The control section 17 terminates the process after the printing has been completed.

On the other hand, if the printing condition is determined as not corresponding to any one of the change inhibited printing conditions (step S33), the control section 17 checks the page image input mode. Specifically, the control section 17 checks whether on the ADF 52 or on the document platen 51 the document is placed by means of a sensor (step S34). The printer 1 determines whether or not to propose the second printing conditions (i.e., recommended printing conditions) according to where the page image is read. That is, the OC mode is often used in cases where the number of page images is one and where the document is of book type, and in like cases. The ADF mode, on the other hand, is often used in cases where plural page images are to be printed because no time and labor is necessary to change page images manually. For this reason, according to the present invention the printer 1 performs printing as instructed by the user without proposing the second printing conditions (i.e., recommended printing conditions) for reduction in the usage of printing sheets when in the OC mode which is often used to print one page image. When in the ADF mode which is likely used to print plural page images, the printer 1 proposes the second printing conditions (i.e., recommended printing conditions). By proposing the second printing conditions (i.e., recommended printing conditions) only when the second printing conditions are considered to be effective while avoiding proposal of the second printing conditions (i.e., recommended printing conditions) when the second printing conditions are not considered to be effective, reduction in the usage of printing sheets can be made in a convenient manner for the user.

When the document is placed on the document platen 51, the control section 17 determines that the current input mode is the OC mode and allows the scanner unit 53 to read the page image of the document placed on the document platen 51 without proposing the second printing conditions (i.e., recommended printing conditions) and without updating the resources saving status stored in the storage section 18. Thereafter, printing is performed under the printing condition set by the user (step S35). The control section 17 terminates the process after the printing has been completed.

On the other hand, when the document is placed on the document tray 521 of the ADF 52 in step S34, the control section 17 determines that the current input mode is the ADF mode and then causes the ADF 52 to feed page images one by one onto the document platen 51 to allow the scanner unit 53 to read the page images while counting the number of pages images (step S36).

When the counting of the number of the page images is completed, the control section 17 compares the preset threshold value to the ratio of reduction in the usage of printing sheets which will be obtained as a result of change from the first printing condition entered by the user to each of the sheet saving printing conditions (for example 2-up printing (single-side)), based on the information on the number of page images to be printed (step S37).

When the ratio of reduction in the usage of printing sheets is less than the threshold value, the control section 17 causes printing to be performed under the first printing condition entered by the user which is regarded as the final printing condition without updating the resources saving status stored in the storage section 18 (step S35). The control section 17 terminates the process after the printing has been completed.

When there are printing conditions that provide ratios of reduction in the usage of printing sheets which are not less than the threshold value, on the other hand, the control section 17 causes the operating panel 14 to display those printing conditions as the second printing conditions (i.e., recommended printing conditions) for the user. Also, the control section 17 calculates the ratio of reduction in the number of sheets used in the present month based on the resources saving status stored in the storage section 18 and displays the result of the calculation on the display section (step S38).

Subsequently, the control section 17 starts clocking the preset fixed time period (for example 20 seconds) (step S39).

Upon lapse of the fixed time period, the control section 17 checks whether or not an operation on the operating panel 14 has been done (steps S40 to S44). When an operation of instruction not to change the printing condition is received within the fixed time period (step S41), the control section 17 causes printing to be performed under the first printing condition regarded as the final printing condition without updating the resources saving status stored in the storage section 18 (step S35) in the cases where: the first printing condition entered by the user is determined as corresponding to any one of the change inhibited printing conditions (step S33); the document is determined as being placed on the document platen (step S34); and the first printing condition entered by the user is determined as being impossible to reduce the usage of printing sheets (step S37).

In response to selection of any printing condition from one or more second printing conditions (i.e., recommended printing conditions) (step S42), the control section 17 uses the second printing condition thus selected as the final printing condition (step S43).

When an operation of definitive instruction to fix the printing condition selected from the one or more second printing conditions (i.e., recommended printing conditions) is received within the fixed time period (step S44), the control section 17 updates the resources saving status stored in the storage section 18 (step S45) and causes printing to be performed under the selected second printing condition regarded as the final printing condition (step S46). The control section 17 terminates the process after the printing has been completed.

If it is determined that the fixed time period has elapsed before any one of the buttons in the economical setting window 33 is operated (step S40), the control section 17 causes printing to be performed under the first printing condition entered by the user without updating the resources saving status stored in the storage section 18 (step S35).

The control section 17 immediately starts printing under the printing condition changed by the user if the printing condition is a face-down printing condition. If the printing condition is a face-up printing condition, on the other hand, the control section 17 starts printing after reading of page images has been completed.

As described above, the present invention allows printing to be performed according to the printing condition as entered by the user without proposing the second printing conditions (i.e., recommended printing conditions) when a sheet saving effect cannot be expected by any sheet saving printing condition, for example, when the number of page images is one. By so doing, useless proposal can be avoided. Also, it is possible to improve ease of use for the user. Further, when there are printing conditions each having a higher sheet saving effect than the printing condition entered by the user, those printing conditions which have higher sheet saving effects are proposed as the second printing conditions (i.e., recommended printing condition) and, hence, the user can save printing sheets easily.

While the foregoing description has been directed to the exemplary arrangement in which the second printing conditions (i.e., recommended printing conditions) are proposed by being displayed on the display 22 of the information processing device 2 or on the operating panel 14 of the printer 1, the present invention is not limited to such an arrangement. Such a proposal may be made by voice information. In this case, the information processing device 2 or the printer 1 is provided with informing means such as a speaker. It is also possible to inform the user of the proposal by voice and display both.

The foregoing embodiments are illustrative in all points and should not be construed to limit the present invention. The scope of the present invention is defined not by the foregoing embodiment but by the following claims. Further, the scope of the present invention is intended to include all modifications within the scopes of the claims and within the meanings and scopes of equivalents.

What is claimed is:

1. A printing control system comprising:
    operation means configured to enter a first printing condition including the number of page images to be printed on one side or both sides of one printing sheet;
    display means;
    control means configured to set a final printing condition based on the first printing condition entered by the operation means; and
    printing means configured to perform printing based on the final printing condition set by the control means, wherein:
    the control means determines whether or not the first printing condition corresponds to any one of plural change inhibited printing conditions preset, the change inhibited printing conditions being conditions under which wasteful printed matters of no use are produced if changed to sheet saving printing conditions, and then sets the first printing condition as the final printing condition when the first printing condition is determined as corresponding to any one of the change inhibited printing conditions while the control means determines whether or not there are one or more second printing conditions each providing a higher ratio of reduction in the usage of printing sheets than that of the first printing condition when the first printing condition is determined as not corresponding to any one of the change inhibited printing conditions, and causes the display means to display the second printing conditions when there are second printing conditions; and
    the operation means includes selection means configured to select the final printing condition from the first printing condition entered by the operation means and the one or more second printing conditions displayed by the display means.

2. The printing control system according to claim 1, wherein:
    the control means includes storage means having stored therein a table registered with plural sheet saving printing conditions each including the number of page images to be printed on one side or both sides of one printing sheet, the number of page images to be printed and the ratio of reduction in the usage of printing sheets determined from these numbers;
    when the first printing condition is determined as not corresponding to any one of the change inhibited printing conditions, the control means extracts from the table stored in the storage means one or more sheet saving printing conditions each providing a higher ratio of reduction in the usage of printing sheets than the first printing condition and then causes the display means to display, as the one or more second printing conditions, one or more predetermined sheet saving printing conditions selected from the one or more sheet saving printing conditions thus extracted; and
    the operation means includes selection means configured to select the final printing condition from the one or more second printing conditions displayed by the display means.

3. The printing control system according to claim 2, wherein the control means causes the display means to display, as the one or more second printing conditions, one or more printing sheet saving conditions each providing a higher ratio of reduction in the usage of printing sheets than a predetermined threshold value that are selected from the one or more sheet saving printing conditions extracted.

4. A printing system comprising:
    a printer configured to print image data on a printing sheet; and
    an information processing device including a control section connected to the printer and configured to transmit the image data to the printer,
    the information processing device including:
        operation means configured to enter a first printing condition including the number of page images to be printed on one side or both sides of one printing sheet;
        display means; and
        control means configured to set a final printing condition based on the first printing condition entered by the operation means, wherein:
        the control means determines whether or not the first printing condition corresponds to any one of plural change inhibited printing conditions preset, the change inhibited printing conditions being conditions under which wasteful printed matters of no use are produced if changed to sheet saving printing conditions, and then sets the first printing condition as the final printing condition when the first printing condition is determined as corresponding to any one of the change inhibited printing conditions while the control means determines whether or not there are one or more second printing conditions each providing a higher ratio of reduction in the usage of printing sheets than that of the first printing condition when the first printing condition is determined as not corresponding to any one of the change inhibited printing conditions and causes the display means to display the second printing conditions when there are second printing conditions; and
        the operation means includes selection means configured to select the final printing condition from the first printing condition entered by the operation means and the one or more second printing conditions displayed by the display means.

5. The printing system according to claim 4, wherein:
    the control means includes storage means having stored therein a table registered with plural sheet saving printing conditions each including the number of page images to be printed on one side or both sides of one printing sheet, the number of page images to be printed and the ratio of reduction in the usage of printing sheets determined from these numbers;

when the first printing condition is determined as not corresponding to any one of the change inhibited printing conditions, the control means extracts from the table stored in the storage means one or more sheet saving printing conditions each providing a higher ratio of reduction in the usage of printing sheets than the first printing condition and then causes the display means to display, as the one or more second printing conditions, one or more predetermined sheet saving printing conditions selected from the one or more sheet saving printing conditions thus extracted; and the operation means includes selection means configured to select the final printing condition from the one or more second printing conditions displayed by the display means.

6. The printing system according to claim 5, wherein the control means causes the display means to display, as the one or more second printing conditions, one or more printing sheet saving conditions each providing a higher ratio of reduction in the usage of printing sheets than a predetermined threshold value that are selected from the one or more sheet saving printing conditions extracted.

* * * * *